United States Patent Office 2,773,051
Patented Dec. 4, 1956

---

2,773,051

PREPARATION OF RESINS FROM C₅ FRACTIONS AND CYCLOPENTADIENE DIMERS

Robert F. Leary, Cranford, N. J., assignor to Esso Research and Engineering Company, a corporation of Delaware No Drawing. Application July 3, 1953,
Serial No. 366,061

2 Claims. (Cl. 260—82)

This invention is concerned with the preparation of high quality resins by the Friedel-Crafts polymerization of selected fractions of steam-cracked petroleum streams, and more particularly, with the improvement of resins prepared from steam-cracked streams having $C_5$ components by the addition thereto of restricted amounts of cyclopentadiene monomers and dimers.

In general, heavier petroleum fractions such as naphtha, kerosene, gas oil, and the like, are cracked at relatively low pressures and at temperatures of 1000 to 1600° F. in the presence of steam and for relatively short contact times. The gas and liquid streams produced contain large quantities of diolefins and olefins in the $C_5$ to $C_{10}$ range. The naphtha distillate streams obtained by these steam cracking operations contain relatively large amounts of diolefins, olefins, aromatics, and some paraffins.

The process of this invention involves the selection and polymerization of blends prepared from a $C_5$ fraction of olefins boiling below about 38° C. together with critical amounts of cyclopentadienes.

To obtain the selected and preferred polymerization feed streams to be used in this invention, the streams containing $C_5$ olefins are initially processed to remove the isoprene, piperylene and cyclopentadienes. The cyclopentadienes are removed as dimers. The chief components include cyclopentadiene dimer and methyl cyclopentadiene dimer, and the codimer.

By an initial thermal soaking of the $C_5$ to $C_8$ or $C_9$ fraction boiling from the initial boiling point up to about 140° C. with sufficient heating time, the cyclopentadienes are dimerized and separated by careful vacuum or steam distillation. Preferred dimerizing temperatures are in the range of 100–220° F. The dimers are removed as a bottoms fraction from the distillation tower, the tower being operated to prevent any substantial depolymerization of the cyclopentadienes. In this distillation, the $C_5$–$C_8$ hydrocarbons boiling below the dimers are removed as an overhead distillate stream.

The overhead is then refractionated to obtain a cut boiling up to about 38° C., which will contain the isoprene, a very small amount of piperylene, and the lower boiling $C_5$ olefins. This step separates most of the piperylene and the higher boiling $C_5$ olefins, together with $C_6$ to $C_8$ compounds, as the distillation bottoms. A suitable extraction process (e. g. extractive distillation with acetone) applied to the I. B. P.–38° C. fraction removes and recovers the isoprene and usually the small amount of piperylene, leaving a raffinate which contains principally the lower boiling $C_5$ olefins.

The total $C_5$ fraction in the original $C_5$–140° C. cut has the following general composition:

| Component: | Wt. percent |
|---|---|
| Isoprene | 12–18 |
| Cyclopentadiene | 12–18 |
| Piperylene | 15–10 |
| Other diolefins | 1–2 |
| Branched chain olefins | 18–23 |
| Normal olefins | 20–28 |
| Cyclic olefins | 4–6 |
| Paraffins | 1–3 |

After removal of isoprene, piperylene, and higher boiling components, the I. B. P. to 38° C. fraction has the following general composition:

| Component: | Wt. percent |
|---|---|
| Normal olefins | 55–65 |
| Branched chain olefins | 35–45 |
| Paraffins | 1–3 |
| Residual diolefins | 3–6 |

This fraction is then mixed with 10 to 50 wt. percent of cyclopentadiene dimers before the polymerization step. The resulting blends are polymerized with a Friedel-Crafts catalyst, for example, the aluminum halide catalysts. Aluminum chloride and aluminum bromide are quite satisfactory.

Without the cyclopentadiene dimers being present, the $C_5$ fraction, upon polymerization, gives low molecular weight, oily polymers of little or no value.

By operating according to this invention, resins of higher softening points and good color qualities can be prepared by including in the unsaturated stream above 10% up to 50% of dicyclopentadiene, di-methylcyclopentadiene, or di-$C_7$-cyclopentadienes, codimers, mixtures of dimers, or concentrates thereof, based on the amount of total hydrocarbon feed.

It is preferable to add the cyclopentadienes to the feed as the dimers rather than as the monomers, since the monomers when present in any appreciable concentration in the polymerization reaction mixture, tend to give products containing insoluble, gelled polymer. This tendency to give gel can be reduced by adding the cyclopentadiene monomer to the reaction mixture after the catalyst is added, or by carrying out the reaction in a continuous fashion. In the latter case, feed and catalyst are added to an agitated vessel, from which the product overflows. The concentration of active monomers in the vessel is low at all times, and it has been found that the tendency to form gel is therefore reduced.

As a convenient source of the dimers, the cyclopentadienes can be converted to dimers by thermal soaking, following which the total soaked stream is subjected to distillation under conditions whereby the cyclopentadiene dimers are maintained in the dimerized form, and are separated as a residue. The dimers are then blended with the $C_5$ cut. If desired, selective portions (i. e. $C_5$ or $C_6$ cyclopentadienes) of the cyclopentadienes are dimerized and added to the separated $C_5$ distillate fraction in order to obtain the improved olefinic feed for the polymerization.

Generally, in the preparation of these petroleum resins, catalyst concentrations of 0.5 up to 3.0% are advantageously employed and the polymerizations are carried out at temperatures of −20 up to 90° C., preferably 0 to 75° C.

The polymerization reaction is carried out as a liquid phase operation. The catalyst may be added continually or batchwise. Any practical and effective methods for adding catalyst and reactants can be utilized.

The time required to carry out the polymerization depends primarily on the rate that the catalyst can be added such that the reaction can be adequately controlled. The products are worked up by water or caustic washing or by washing with dilute $H_2SO_4$ (5%) followed by water washing. The catalyst residues can also be removed by precipitation as a methanol catalyst complex followed by subsequent filtration. The polymerized resin is then stripped free of unreacted feed components and any of the low molecular weight polymerization products to give the final oil or resin. The exact yield and softening point of the final product will depend on the degree of stripping.

These solid resins can be used as a base for paint, in formulations for floor tile and the like, for varnish manufacture, or formulated into printing ink. The resin has a good color and odor and is miscible in a naphtha solvent.

Typical examples of the invention are set forth below, although it is not intended to limit the invention in any way to the particular experiments presented.

EXAMPLE 1

A typical fraction used in the following blends with the cyclopentadiene dimers contains the following components:

Pentene-1
Cis and trans.-pentene-2
2-methyl-1-butene
2-methyl-2-butene
3-methyl-1-butene
n-Pentane
i-Pentane, and very small amounts of Cis and trans.-piperylene
Cyclopentene
Cyclopentadiene
Cyclopentane The above fraction having a boiling range from about 20 up to 38° C. was then blended with varying amounts of a dimer fraction having about 40% cyclopentadiene dimer and about 35% methylcyclopentadiene dimer and the resulting blends subjected to polymerization with $AlCl_3$ catalyst at 20–30° C. The excess catalyst was removed by caustic and water washing prior to distillation step to recover the resin formed. The data obtained are tabulated in Table I below.

Table I

| Run No. | Feed Composition | $AlCl_3$ Catalyst, Wt. Percent | Wt. Percent Yield | | Softening Point of Resin, °C. |
|---|---|---|---|---|---|
| | | | Resin | Fill Material [1] | |
| 1 | $C_5$ fraction [2] | 1.0 | 17.8 | 17.5 | Below Room Temperature. |
| 2 | ----do [2] | 2.0 | 28.5 | 24.0 | Do. |
| 3 | Dimers | 2.0 | 45.0 | ---------- | 150. |
| 4 | {50% $C_5$ / 50% Dimers} | 2.0 | 37.5 | 9.5 | 130. |
| 5 | {70% $C_5$ / 30% Dimers} | 2.0 | 33.3 | 8.2 | 94. |

[1] Fill material is a low molecular weight polymer (oil) which must be stripped from the resin to reach the softening point indicated.
[2] No dimers added.

The above results show that the $C_5$ fraction when polymerized alone, gives not resins, but very viscous oils of low value.

EXAMPLE 2

Another series of runs was carried out using various feed mixtures. The conditions of the experiments and the results obtained thereby are shown in Table II. The data show that cyclopentadiene monomers can be utilized as well as dimers, but that precautions should be taken against gel formation with the monomers.

Table II

| Run No. | Feed Composition | Wt. Percent of Feed | | | | Resin | | |
|---|---|---|---|---|---|---|---|---|
| | | Catalyst | Resin | Fill Material | Gel | Soft. Pt., °C. | Color | Iodine No. |
| 6 | {80% $C_5$ / 20% Methylcyclopentadiene Dimer} | 3.0 $AlCl_3$ | 30.6 | 5.0 | -------- | 113.5 | 8 | 211 |
| 7 | {60% $C_5$ / 40% Cyclopentadiene Dimer [1]} | 1.0 $AlCl_3$ | 25.6 | 2.5 | -------- | 109 | 3 | 180 |
| 8 | {80% $C_5$ / 20% Cyclopentadiene Monomer [2]} | 1.0 $AlCl_3$ | 42.0 | -------- | 1.2 | Could not be taken.[3] | 2 | -------- |
| 9 | {80% $C_5$ / 20% Cyclopentadiene Monomer (n-hexane diluent)} | 1.0 $AlCl_3$ in Ethyl Chloride. | 18.0 | -------- | 25.2 | 89.0 | 8 | 180 |

[1] Run at 35° C., the reflux point. Other runs made at 20° C.
[2] Added after $AlCl_3$ catalyst.
[3] Resin gels on heating.

EXAMPLE 3

The data in Table III show that $AlBr_3$ is an effective catalyst, and that a wide range of reaction temperatures can be employed.

Table III

[Reactions with 80% $C_5$–20% cyclopentadiene dimer feed]

| Reaction Temp., °C. | Wt. Percent Catalyst | Wt. Percent Yield | | Resin Soft. Pt., °C. |
|---|---|---|---|---|
| | | Resin | Fill | |
| 0 | 1% $AlCl_3$ | 20.6 | 13.6 | 61.5 |
| 20 | 1% $AlBr_3$ | 15.7 | 12.7 | 59.0 |
| 50 [1] | 0.5% $AlCl_3$ | 8.0 | 12.8 | 67.0 |

[1] Feed diluted with equal volume of n-heptane.

What is claimed is:

1. A process for preparing soluble petroleum resins which comprises blending a $C_5$ steam-cracked petroleum fraction relatively free of cyclopentadienes and dimers thereof and isoprene and boiling up to 38° C. with from 10–50 wt. percent of cyclopentadiene dimers, subjecting the resulting blend to polymerization at temperatures of from −20 to +90° C. in the presence of aluminum halide and isolating the resin produced thereby.

2. Process according to claim 1 in which the catalyst is aluminum chloride and the temperature is maintained at between 0 and +75° C.

References Cited in the file of this patent

UNITED STATES PATENTS

| 1,982,708 | Thomas | Dec. 4, 1934 |
| 2,521,022 | Rowland | Sept. 5, 1950 |